July 29, 1958

F. LEBER 2,844,967

SHIFTING ARRANGEMENT FOR CHANGE GEAR TRANSMISSIONS

Filed Nov. 9, 1955

INVENTOR
Felix Leber
By
Patent Agent

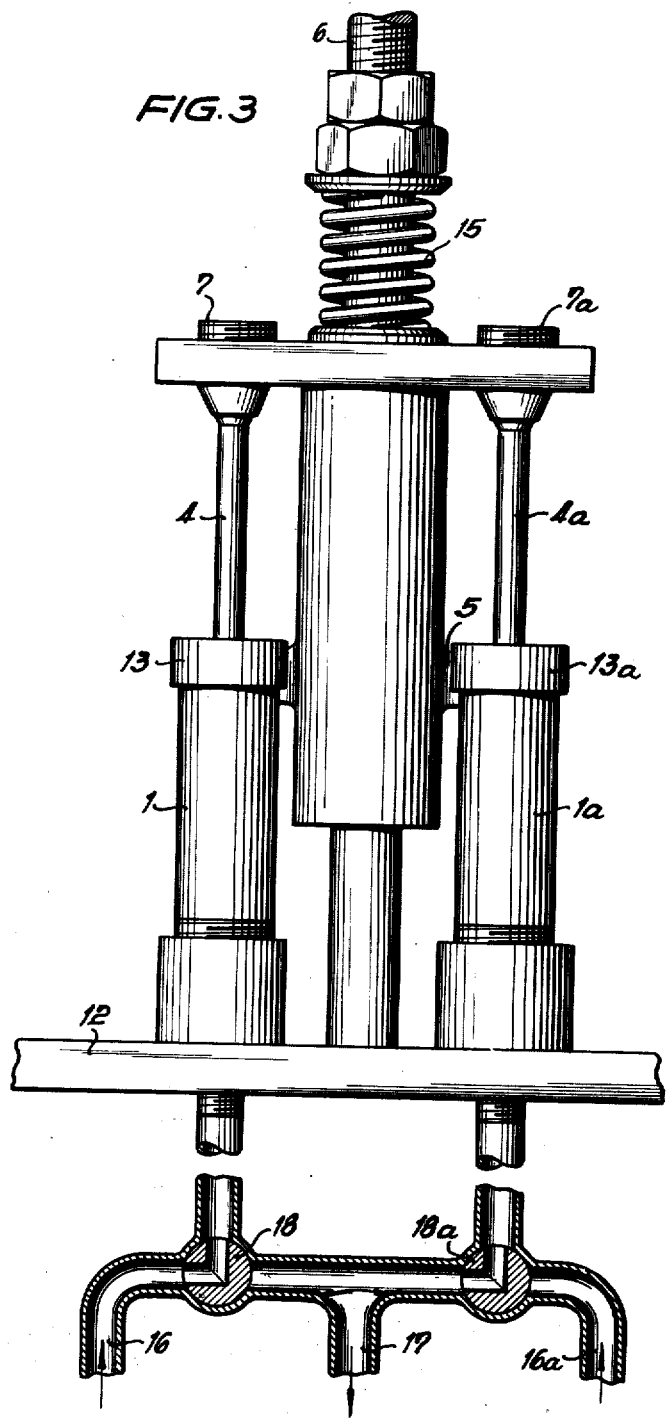

United States Patent Office 2,844,967
Patented July 29, 1958

2,844,967

SHIFTING ARRANGEMENT FOR CHANGE GEAR TRANSMISSIONS

Felix Leber, Koln-Riehl, Germany

Application November 9, 1955, Serial No. 545,907

Claims priority, application Germany November 12, 1954

6 Claims. (Cl. 74—335)

The present invention relates to an arrangement for shifting the shift forks of change gear transmissions, especially for use in connection with transmissions of machine tools.

With shifting arrangements of this type, the shift fork is usually axially slidably mounted on a guiding rod which is parallel to the transmission shaft pertaining to the shift fork. The driving means for the shift fork, for instance a hydraulically or pneumatically actuated piston cylinder system, is connected to the transmission casing. The shift fork and the driving means are interconnected by a connecting rod which is parallel to the guiding rod for the shift fork and which conveys the movement of the driving means to the shift fork.

With heretofore known transmissions, the connecting rod is rigidly connected to the shift fork and the driving means. Consequently a locking or clamping of the driving means is unavoidable if there exists the slightest deviation from the parallelism or in the distance between the guiding rod for the shift fork and the center line of movement of the driving means, for instance the center line of the cylinder when a hydraulic or pneumatic driving system is employed. In such an instance a larger moving force is required and greater wear of the parts of the shifting arrangement is encountered. Especially with arrangements in which the movement of the shift fork is effected hydraulically or pneumatically by means of a piston reciprocably mounted in a cylinder, any locking or clamping must be avoided since otherwise the pressure of the working medium for overcoming the additional friction caused by such clamping has to be increased and furthermore the driving eelment will soon become leaky due to the increased wear.

The heretofore known arrangements with rigidly connected connecting rods require a very precise machining and installing in order to counteract the above mentioned drawbacks. Aside from the disadvantages brought about by such a precise manufacturing process and installation, locking or clamping is still encountered.

It is, therefore, an object of the present invention to provide a shifting arrangement of the above mentioned type which will overcome the drawbacks outlined above of heretofore known shifting arrangements.

It is another object of this invention to provide a shifting arrangement for shifting the shift forks of change gear transmissions, which while overcoming the drawbacks set forth above in connection with heretofore known shifting arrangements will not require a precise manufacturing process nor a precise installation.

It is still another object of this invention to provide a shift fork actuating arrangement which is rather simple and sturdy and will cut down wear to a minimum.

These and other objects and advantages of the invention will appear more clearly from the following specification in connection with the accompanying drawings, in which:

Fig. 3 illustrates a shift fork arrangement according to the invention which includes the arrangements of Figs. 1 and 2, thereby making it possible to shift the shift fork from its normal position selectively into either one of two other positions.

*General arrangement*

Figure 2:
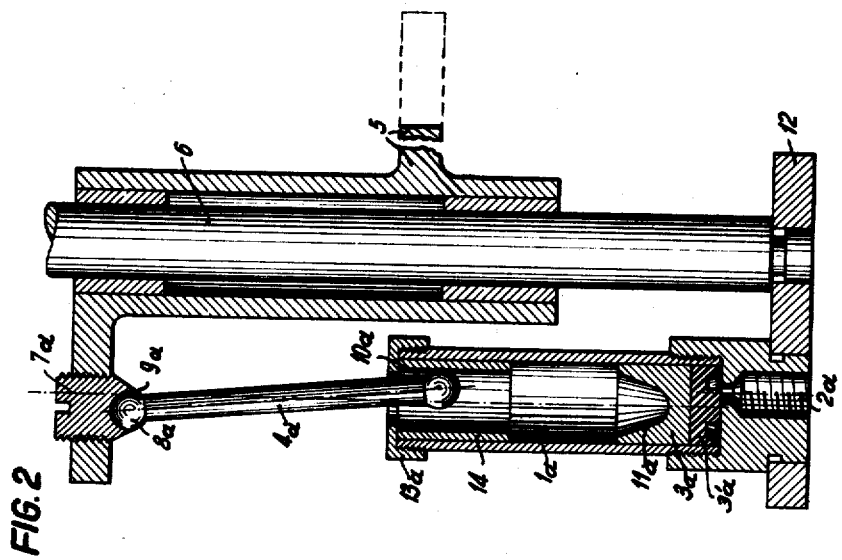
Fig. 2 is a longitudinal section through a shift fork arrangement similar to that of Fig. 1 and employing a cylinder of the same dimensions as that of Fig. 1 but provided with means limiting the piston stroke over that of Fig. 1.

The primary feature of the present invention consists in that in contrast to heretofore known arrangements the connecting rod is linked in a manner of a universal joint to the shift fork and to the driving means, for instance to a hydraulically or pneumatically actuated piston. With such an arrangement, a precise parallelism or a precise maintenance of the distance between the center line of the guiding rod for the shift fork and the center line of movement of the driving means is not necessary any longer. The manufacture and installation of the shifting arrangement for the transmission is, therefore, considerably facilitated. The universal joint-like connection of the connecting rod with the driving means and the shift fork may be effected in a particularly simple manner by providing both ends of the connecting rod with a ball head while a corresponding cup is respectively provided at the shift fork and the piston of the driving means for receiving said ball heads.

The manufacture and installation of the shifting arrangement involved is additionally facilitated if, in conformity with a further development of the invention, the cup for receiving the adjacent end of the connecting rod is formed by an adjustable screw inserted into the shift fork. With such an arrangement, it is not necessary to maintain precise tolerances or limits of the individual parts in the direction of movement of the shift fork, inasmuch as the adjustment in this direction can easily and quickly be effected by adjusting said screw. With slide gear transmissions, for instance a gear block and therefore also the shift fork pertaining thereto may have more than two effective positions. To this end, a further cylinder piston system may be provided for each additional effective position. All driving elements will have a different structure. The various end positions of said driving means, i. e. the end positions in which the respective piston strikes an abutment, will correspond to the various desired shifting or effective positions. With such devices, according to the present invention that ball head of the connecting rod which is adjacent the piston of the driving element is received in a ball cup open toward the other end of the connecting rod, whereas the ball head at said other end of the connecting rod is received in a closed ball cup. In this way, the connecting rods of those driving elements which have a smaller maximum stroke than another driving means of the arrangement can detach themselves from their respective piston when said driving means with larger stroke occupies a position corresponding to said larger stroke. On the other hand, when the shift fork returns to its starting position the ball heads adjacent the respective pistons will safely return to their normal positions in said pistons due to the fact that the receiving cups for the respective ball heads conically open toward the other end of the respective connecting rod.

Inasmuch as that end of each connecting rod which is remote from the driving means or pistons is normally non-detachably linked to the shift fork, so that it will move therewith at all times, it is necessary to prevent the other end of the respective connecting rod to drop out of the respective cylinder pertaining thereto. To this end, it is most expedient to design the cylinders of all driving means with the same length and to limit the stroke of said cylinders by abutments arranged at different points in said cylinders. Inasmuch as the stroke of the shift fork in each instance cannot be longer than the length of the cylinder, a dropping out of the connecting rods of said cylinders will not be possible even during the longest strokes. The arrangement just described also yields the advantage that the cylinders, pistons and the like of all driving elements can be identical and only the abutments or positions of the abutments will have to be varied.

*Structural arrangement*

Figure 1:
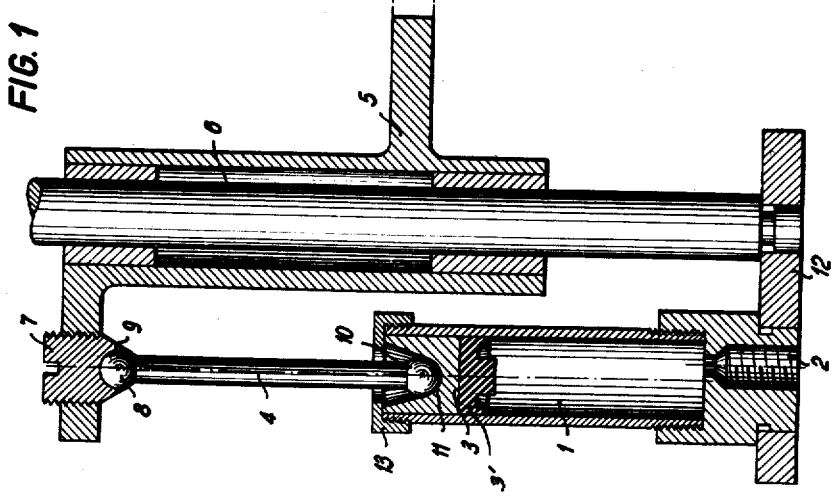
Fig. 1 is a longitudinal section through a shift fork arrangement according to the present invention.

Referring now to the drawing in detail and Fig. 1 thereof in particular, this figure shows a shift fork 5 adapted to be moved by a cylinder piston system 1, 3 from a starting position into a first effective position, while spring means—not shown in Fig. 1 but arranged similar to and of the type of spring 15 in Fig. 3—are adapted to return the fork 5 to its starting position.

As will be seen from Fig. 2, the cylinder 1 is adapted to be supplied with pressure fluid through a connection 2. As pressure fluid, oil or water under pressure or air under pressure may be employed. The movement of the piston 3 is conveyed to a connecting rod 4 which in its turn conveys its movement to the shift fork 5. The shift fork 5 is axially slidably mounted on a guiding rod 6. The member 3' represents a sealing gasket of any standard type connected to piston 3 in any convenient manner.

Each end of the connecting rod 4 is provided with a ball-shaped head 8, 10. As will be seen from the drawing, the ball-shaped head 8 is journalled in an adjusting screw 7 which adjustably and threadably engages a flange 17 of the shift fork 5 and is provided with a closed cup 9. The other ball-shaped head 10 of the connecting rod 4 is journalled in an open ball cup 11 forming a part of the piston 3. As will be evident from the drawing, the cup 11 conically widens toward the head 8 of the connecting rod 4. The cylinder 1 and the guiding rod 6 are connected to the casing 12 of the transmission. The maximum stroke of the piston 3, and thereby the movement of the shift fork 5 into its outermost effective position is limited by the lid or abutment 13 threadedly connected to the cylinder 1.

Fig. 2 shows a cylinder piston system which differs from that of Fig. 1 in that the piston stroke is limited over that of Fig. 1 so that it can bring about a limited shifting movement only of the shift fork 5. Those parts of the Fig. 2 arrangement which correspond to those of Fig. 1 have been designated with the same reference numerals but with the additional character *a* so that a further detailed description of these parts will not be necessary. The structure of Fig. 2 differs from that of Fig. 1 merely in that an additional sleeve 14 is inserted in the cylinder 1a. This sleeve 14 serves as abutment for the piston 3a so as to stop the same at a position corresponding to an intermediate shift position of the fork 5.

As indicated in the introductory portion to the specification, any deviation in the parallelism between the cylinders 1, 1a and the axis of the guiding rod 6 will have no harmful effect upon the proper functioning of the device. Such deviation would result in an eccentricity of the center lines of the cylinders 1, 1a and the respective center line of the adjusting screws 7, 7a. Such eccentricity has been shown in an exaggerated manner in Fig. 2. As will be clear from this Fig. 2, such eccentricity merely causes an inclined position of the connecting rod without, however, causing any clamping, jamming or the like.

Fig. 3 represents an arrangement, in which the systems of Figs. 1 and 2 are combined and act upon one and the same shift fork 5. Inasmuch as in Fig. 3 the same reference numerals are employed for designating the elements of Figs. 1 and 2 respectively, a further description of Fig. 3 appears to be superfluous. Fig. 3, however, shows the return spring 15 for the shift fork 5 and also diagrammatically illustrates the supply and discharge connections 16, 16a and 17 respectively with the valves 18 and 18a.

It will be evident from the preceding description in connection with Fig. 3 that, when the piston 1 has moved outwardly into its outermost effective position as shown in Fig. 1, the connecting rod 4a of Fig. 2 will have been carried along by the shift fork 5 and will thus have been lifted out of the piston 3a. However, since the cylinder 1a has the same length as the cylinder 1, the head 10a of the connecting rod 4a cannot drop out of the cylinder 1a. On the other hand, when the shift fork 5 moves to its starting position, it will be clear that the head 10a will due to the conical shape of the cup 11a be safely guided back into said cup so that the piston 3a can shift the fork 5 into its intermediate position as soon as pressure is conveyed into the cylinder 1a through the connection 2a.

While Fig. 3 has been described in connection with a shifting arrangement for shifting the shift fork from a starting position selectively into a first or second effective position, the invention is, of course, not limited to such particular arrangement but in addition to being applicable for effecting one shifting position only as in Figs. 1 and 2, can also be employed with a shift fork to be moved into more than two effective positions. Furthermore, the invention also comprises any modifications within the scope of the appended claims.

What I claim is:

1. A shifting arrangement including a shift fork movable along a certain straight path for change gear transmissions, which comprises in combination: a fluid operable movable member arranged for movement substantially parallel to said straight path of said shift fork, connecting rod means, and universal joint means respectively associated with said connecting rod means and connecting the same with said movable member and said shift fork.

2. A shifting arrangement including a shift fork movable along a certain straight path for change gear transmissions, which comprises in combination: a fluid operable reciprocable member arranged for movement substantially parallel to said straight path of said shift fork, a connecting rod provided at each end thereof with a ball-shaped head, first socket means associated with said fluid operable member for engagement with the ball-shaped head at one end of said connecting rod, and second socket means connected to said shift fork for engagement with the ball-shaped head at the other end of said connecting rod.

3. A shifting arrangement including a shift fork movable along a certain straight path for change gear transmissions, which comprises in combination: a fluid operable reciprocable member arranged for movement substantially parallel to said straight path of said shift fork, a connecting rod provided at each end thereof with a ball-shaped head, first socket means associated with said fluid operable member for engagement with the ball-shaped head at one end of said connecting rod, adjustable screw means threadedly engaging said shift fork and comprising second socket means for engagement with the ball-shaped head at the other end of said connecting rod.

4. A shifting arrangement including a shift fork movable along a certain straight path for change gear transmissions, which comprises in combination: a fluid operable reciprocable member arranged for movement substantially parallel to said straight path of said shift fork, a connecting rod provided at each end thereof with a ball-shaped head, a first cup associated with said fluid operable member and having a bell-shaped opening for receiving one of said ball-shaped heads, said bell-shaped opening widening toward the other head of said connecting rod, a second cup supported by said shift fork and receiving said other ball-shaped head of said connecting rod, said second cup surrounding the major surface of said other ball-shaped head so as to firmly hold the same connected thereto.

5. A shifting arrangement including a shift fork movable along a certain straight path for change gear transmissions, which comprises in combination: a fluid operable reciprocable member arranged for movement substantially parallel to said straight path of said shift fork, a connecting rod provided at each end thereof with a ball-shaped head, first socket means associated with said fluid operable member for engagement with the ball-shaped head at one end of said connecting rod, second socket means connected to said shift fork for engagement with the ball-shaped head at the other end of said connecting rod, and abutment means arranged to limit the maximum stroke of said fluid operable member.

6. A shifting arrangement including a shift fork movable along a certain straight path for change gear transmissions, which comprises in combination: a plurality of stationarily arranged cylinders, each of said cylinders having the same length, a plurality of piston means respectively reciprocably mounted in said cylinders and arranged for movement substantially parallel to said straight path of said shift fork, means respectively associated with said cylinders for admitting fluid thereto independently of each other, a plurality of connecting rods, each of said connecting rods having a ball-shaped head at one end thereof, universal joint means connecting the other end of each of said connecting rods to said shift fork, said piston means respectively comprising cup means with a bell-shaped depression widening toward said universal joint means for respectively receiving the ball-shaped heads of said connecting rods, and abutment means respectively arranged in said cylinders and respectively effective at different points of the strokes of said piston means to thereby stop the piston means in one cylinder after a shorter stroke than the stroke of the piston means in another cylinder.

References Cited in the file of this patent

UNITED STATES PATENTS

| | | |
|---|---|---|
| 1,866,347 | Crocker | July 5, 1932 |
| 2,013,388 | Lacey | Sept. 3, 1935 |